United States Patent
Ma

(10) Patent No.: US 9,213,428 B2
(45) Date of Patent: Dec. 15, 2015

(54) PORTABLE ELECTRONIC DEVICE INCLUDING FLEXIBLE DISPLAY

(75) Inventor: Ming-Lun Dave Ma, Brampton (CA)

(73) Assignee: BLACKBERRY LIMITED, Waterloo (CA)

( * ) Notice: Subject to any disclaimer, the term of this patent is extended or adjusted under 35 U.S.C. 154(b) by 103 days.

(21) Appl. No.: 12/950,894

(22) Filed: Nov. 19, 2010

(65) Prior Publication Data

US 2012/0127087 A1    May 24, 2012

(51) Int. Cl.
*G06F 1/16* (2006.01)
*G06F 3/041* (2006.01)

(52) U.S. Cl.
CPC ............ *G06F 3/041* (2013.01); *G06F 1/1616* (2013.01); *G06F 1/1643* (2013.01); *G06F 1/1652* (2013.01); *G06F 2203/04803* (2013.01)

(58) Field of Classification Search
CPC ..... G06F 3/041; G06F 1/1616; G06F 1/1643; G06F 1/1652; G06F 2203/04803
See application file for complete search history.

(56) References Cited

U.S. PATENT DOCUMENTS

| | | | | |
|---|---|---|---|---|
| 6,862,053 | B2 * | 3/2005 | Lee et al. | 349/58 |
| 6,876,876 | B2 | 4/2005 | Uhlemann | |
| 6,927,908 | B2 * | 8/2005 | Stark | 359/449 |
| 7,027,110 | B2 * | 4/2006 | Akiyama et al. | 349/58 |
| 7,127,776 | B2 | 10/2006 | Park | |
| 7,151,541 | B2 * | 12/2006 | Seder | 345/473 |
| 7,548,415 | B2 | 6/2009 | Kim | |
| 7,672,119 | B2 | 3/2010 | Hollander | |
| 7,948,176 | B2 * | 5/2011 | Oh et al. | 313/512 |
| 8,736,162 | B2 * | 5/2014 | Jin et al. | 313/511 |
| 2004/0183958 | A1 * | 9/2004 | Akiyama et al. | 349/58 |
| 2007/0164923 | A1 | 7/2007 | Kanai et al. | |
| 2007/0182663 | A1 * | 8/2007 | Biech | 345/1.1 |
| 2007/0285341 | A1 | 12/2007 | Manning | |
| 2008/0144265 | A1 | 6/2008 | Aoki | |
| 2008/0158795 | A1 | 7/2008 | Aoki | |
| 2008/0236905 | A1 | 10/2008 | Endo et al. | |
| 2009/0115743 | A1 * | 5/2009 | Oowaki | 345/174 |
| 2010/0064244 | A1 | 3/2010 | Kilpatrick, II et al. | |
| 2010/0064536 | A1 | 3/2010 | Caskey et al. | |
| 2010/0225601 | A1 * | 9/2010 | Homma et al. | 345/173 |
| 2010/0259494 | A1 | 10/2010 | Kii | |
| 2010/0302179 | A1 * | 12/2010 | Ahn et al. | 345/173 |
| 2011/0050657 | A1 * | 3/2011 | Yamada | 345/204 |

FOREIGN PATENT DOCUMENTS

| | | |
|---|---|---|
| CN | 101470469 A | 7/2009 |
| EP | 1970886 A1 | 9/2008 |
| WO | 2009/075577 A1 | 6/2009 |

OTHER PUBLICATIONS

Extended European Search Report dated Apr. 13, 2011, issued in respect of corresponding European Patent Application No. 10191984.3.

(Continued)

*Primary Examiner* — Grant Sitta
*Assistant Examiner* — Mihir Rayan
(74) *Attorney, Agent, or Firm* — Geoffrey de Kleine; Borden Ladner Gervais LLP

(57) ABSTRACT

A portable electronic device includes a first flexible display. The first flexible display includes a display area, a non-display area, and a first fold such that at least part of the non-display area is non-coplanar with the display area. Information is displayable near the first fold.

9 Claims, 5 Drawing Sheets

(56) References Cited

OTHER PUBLICATIONS http://gizmodo.com/5097377/samsung-demonstratres-folding-oled-cellphone-vindicates-thousands -of-ridiculous-concepts—Published Nov. 24, 2008.
http://www.techchee.com/2008/09/30/docomo-and-fujitsu-split-into-two-concept-cellphone/—Published Sep. 30, 2008.
http://www.phonemag.com/readius-e-paper-3g-cellphone-hands-on-video-02944.php—Published Feb. 12, 2008.
http://www.geek.com/articles/mobile/researchers-demonstrate-5-inch-folding-mobile-screen-20081124/—Published Nov. 24, 2008.
http://gadgetheat.com/2008/05/30/packet-power/—Published May 30, 2008.
http://www.concept-phones.com/cool-concepts/wild-fold-future-foldable-mobile-phone-concept-based-samsungs-flexible-oled/—Published Dec. 17, 2008.
http://nexus404.com/Blog/2007/05/14/folding-flexi-pda-concept/—Published May 14, 2007.
Office Action dated Dec. 5, 2012, issued in respect of corresponding European Patent Application No. 10191984.3.
Office Action dated Dec. 1, 2012, issued in respect of corresponding Korean Patent Application No. 10-2011-0120466.
Examiner's Report dated Nov. 17, 2014, issued in respect of corresponding Canadian Patent Application No. 2,756,821.
Office Action dated Jul. 7, 2014, issued in respect of corresponding Chinese Patent Application No. 201110357896.5.
Examiner's Report dated Dec. 12, 2013, issued in respect of corresponding Canadian Patent Application No. 2,756,821.
English translation of Office Action dated Jan. 20, 2014, issued in respect of corresponding ROC (Taiwan) Patent Application No. 100141690.
English translation of Office Action dated Dec. 3, 2013, issued in respect of corresponding Chinese Patent Application No. 201110357896.5.
Printout of website: Youtube, "CES 09: Samsung Folding OLED Display", https://www.youtube.com/watch?v=YtN_TkZUOt4 created Jan. 8, 2009.
Printout of website. Singularity Hub, "Samsung Moves Forward With Transparent and Foldina Screens", https://web.archive.org/web/20100224122457/http://singularityhub.com/2010101106/samsung-moves-forward-with-transparent-and-folding-screensvideo, archived Feb. 24, 2010.
Examiner's Report dated Jul. 20, 2015, issued in respect of corresponding Canadian Patent Application No. 2,756,821.

* cited by examiner

PORTABLE ELECTRONIC DEVICE INCLUDING FLEXIBLE DISPLAY

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

Figure 1:
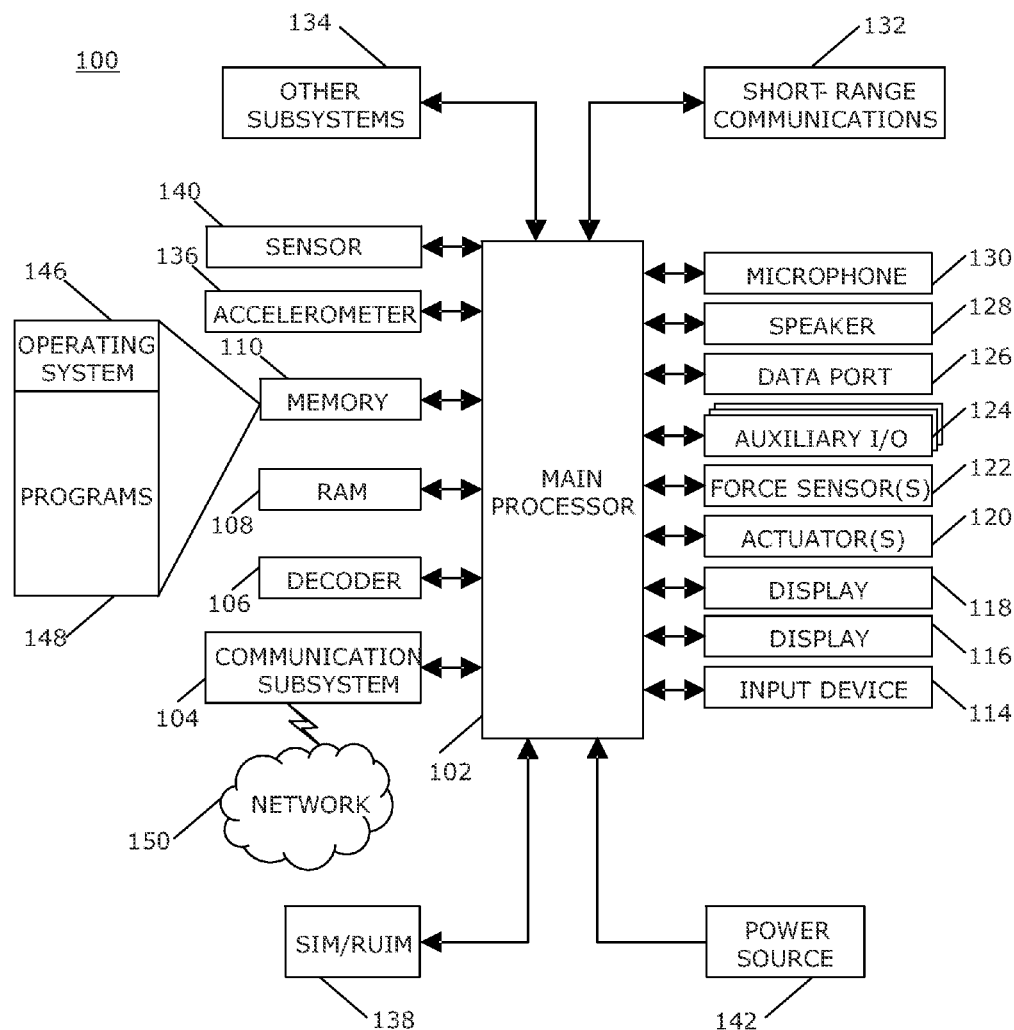
FIG. 1 is a block diagram of a portable electronic device in accordance with the present disclosure.

The following describes a portable electronic device that includes a flexible display. The flexible display includes a display area, a non-display area, also known as an inactive area, and a fold such that at least part of the non-display area is non-coplanar with the display area. Information is displayable near the first fold.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, electronic pads or slates, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, an input device 114, an upper touch-sensitive display 116, a lower touch-sensitive display 118, an auxiliary input/output (I/O) subsystem 124, a data port 126, a speaker 128, a microphone 130, short-range communications 132, and other device subsystems 134. The input device 114 may be, for example, a touch-sensitive track pad, a trackball, an optical joystick, and so forth, to receive an input. The input device 114 may be utilized, for example, for navigation of a cursor, highlighting or other indicator on the upper touch-sensitive display 116. The terms upper and lower as used herein refer to relative position of the upper touch-sensitive display 116 and the lower touch-sensitive display 118 as shown in the figures. The terms upper and lower are not intended to be limiting.

The processor 102 may interact with an accelerometer 136 that may be utilized to detect direction of gravitational forces or gravity-induced reaction forces. Optionally, the processor 102 may interact with one or more actuators 120 and/or one or more force sensors 122.

A sensor 140, which may be, for example, a Hall effect sensor, may also be utilized to detect a position of, for example, the upper touch-sensitive display 116 relative to the lower touch-sensitive display 118. Alternatively, the sensor 140 may be, for example, a mechanical sensor or any other suitable sensor.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The upper touch-sensitive display 116 and the lower touch-sensitive display 118 may include, for example, a display and a touch-sensitive overlay operably coupled to an electronic controller such that the processor 102 interacts with the touch-sensitive overlay via the electronic controller. Information, such as text, characters, symbols, images, icons, and other items that may be displayed or rendered on the portable electronic device 100, may be displayed on the display of one or both of the upper touch-sensitive display 116 and the lower touch-sensitive display 118 via the processor 102. The upper touch-sensitive display 116 and the lower touch-sensitive display 118 may each be any suitable touch-sensitive display such as a capacitive, resistive, infrared, surface acoustic wave (SAW) touch-sensitive display, strain gauge, optical imaging, dispersive signal technology, acoustic pulse recognition, and so forth, as known in the art. Alternatively, a single controller may be utilized for the upper touch-sensitive display 116 and the lower touch-sensitive display 118. Although the upper touch-sensitive display 116 and the lower touch-sensitive display 118 may be substantially identical except as related to their orientation with respect to each other, the upper touch-sensitive display 116 and the lower touch-sensitive display 118 may be different in other ways.

One or more touches, also known as touch contacts or touch events, may be detected by the upper touch-sensitive display 116 and/or the lower touch-sensitive display 118. The processor 102 may determine attributes of a touch, including a location of the touch. Touch location data may include an area of contact or a single point of contact, such as a point at or near a center of the area of contact. A signal is provided to one of the controllers in response to detection of a touch on the upper touch-sensitive display 116 or the lower touch-sensitive display 118. A touch may be detected from any suitable object, such as a finger, thumb, appendage, or other items, for example, a stylus, pen, or other pointer, depending on the nature of the upper touch-sensitive display 116 and/or the lower touch-sensitive display 118. The controller(s) and/or the processor 102 may detect a touch by any suitable contact member on the upper touch-sensitive display 116. Multiple simultaneous touches may be detected.

The optional actuator(s) 120 may be depressed by applying sufficient force to the upper touch-sensitive display 116 or to the lower touch-sensitive display 118 to overcome the actuation force of the actuators 120. The actuators 120 may be actuated by pressing anywhere on the upper touch-sensitive display 116 or on the lower touch-sensitive display 118. The actuators 120 may provide input to the processor 102 when actuated. Actuation of the actuators 120 may result in provision of tactile feedback.

The optional force sensor(s) 122 may provide force information related to a detected touch on the upper touch-sensitive display 116 or on the lower touch-sensitive display 118. The force information may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
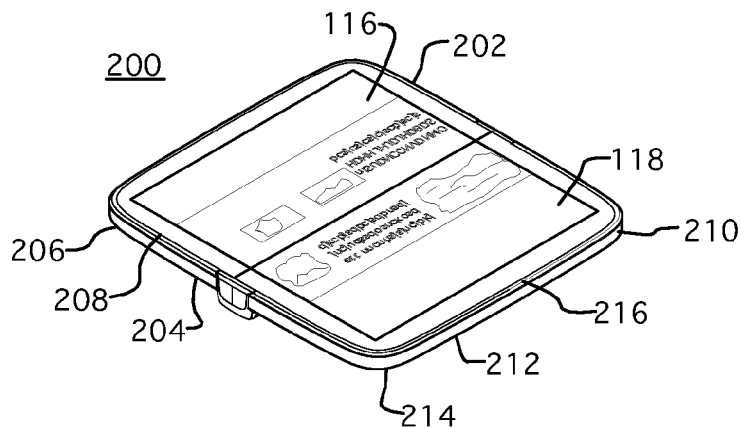
FIG. 2, FIG. 3, and FIG. 4 are perspective views of an example of a portable electronic device in accordance with the disclosure.
Figure 3:
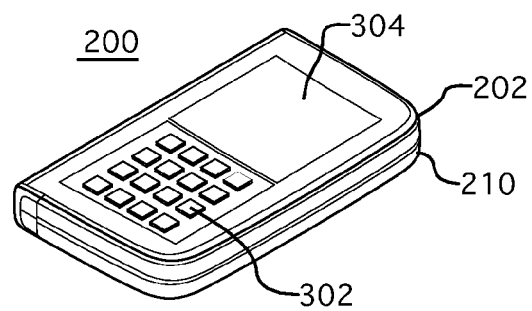
Figure 4:
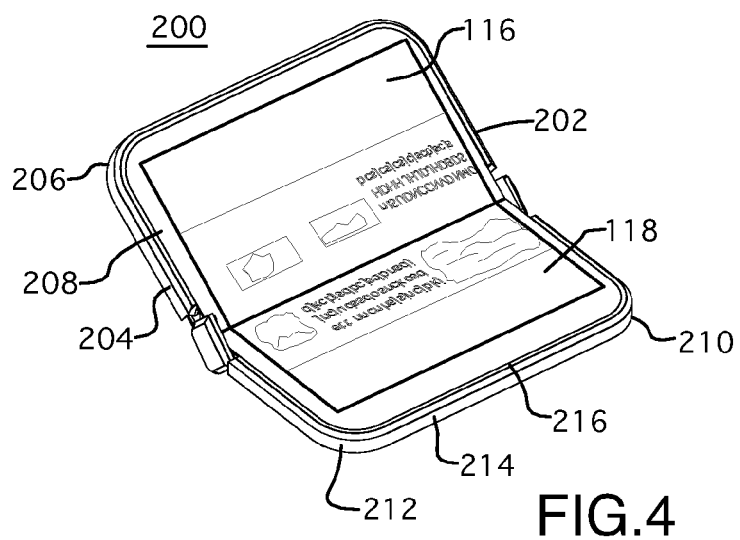

Views of a portable electronic device 200, which is an example of the portable electronic device 100 of FIG. 1, are shown in FIG. 2 through FIG. 4. The portable electronic device 100 includes an upper housing 202 that includes a back 204 and sidewalls 206, and the upper touch-sensitive display 116 is disposed in the housing 202. The portable electronic device 100 also includes a lower housing 210 that includes a back 212 and sidewalls 214 in which the lower touch-sensitive display 118 is disposed. The various components of the portable electronic device 100, such as shown in FIG. 1, may be enclosed in the upper housing 202 and/or the lower housing 210. The various components of the portable electronic device 100 may be distributed among the upper housing 202 and the lower housing 210.

The lower housing 210 may be coupled to the upper housing 202, for example, by a hinge such that one of the sidewalls 206 of the upper housing 202 is adjacent one of the sidewalls 214 of the lower housing 210. The lower housing 210 is rotatable relative to the upper housing 202, about the hinge between opened, as shown in FIG. 2, and closed, as shown in FIG. 3. When opened, the upper touch-sensitive display 116 may be coplanar with the lower touch-sensitive display 118 such that the upper touch-sensitive display 116 and the lower touch-sensitive display 118 face the same direction and both touch-sensitive displays 116, 118 are visible. When closed, as shown in FIG. 3, the upper touch-sensitive display 116 and the lower touch-sensitive display 118 face each other. Optionally, the upper housing 202 or the lower housing 210 may include a keypad 302, also known as a keyboard, and/or an additional display 304 that may be utilized when the portable electronic device 100 is closed. The keypad 302 and the further display 304 may be enabled when the portable electronic device 100 is closed and may be disabled, or powered off, when the portable electronic device 100 is opened. The keypad 302 may be a mechanical keypad, a touch-sensitive keypad including touch-sensitive keys, or a combination of a mechanical keypad and a touch-sensitive keypad.

Components of the upper housing 202 may be electrically coupled to components of the lower housing 210 utilizing, for example, electrical conductors that extend from the upper housing 202 to the lower housing 210. The electrical conductors may be flexible to accommodate rotation and to inhibit cracking, breaking, or bunching.

Alternatively, electrical conductors may be located along a lower edge of the upper housing 202 and electrical conductors may be located along an upper edge of the lower housing 210. The electrical conductors along the lower edge of the upper housing 202 may coupled to the electrical conductors along the upper edge of the lower housing 210 when the portable electronic device 100 opened. The electrical conductors may also be utilized as sensors, for example, to detect when the portable electronic device 100 is opened.

The lower housing 210 may also be rotatable relative to the upper housing 202, into intermediate positions between opened and closed. The lower housing 210 and the upper housing 202 may have releasable locks when opened and/or when closed. The lower housing 210 and the upper housing 202 may also be releasably lockable in any position in between, such as the position shown in FIG. 4. For example, detents and complementary recesses may be utilized to releasably lock the lower housing 210 relative to the upper housing 202. For example, detents and complementary recesses may be utilized to lock the lower housing 210 in alignment with the upper housing 202. A nominal force may be utilized to release the locks, which force is sufficient to prevent inadvertent release. A release mechanism such as a sliding bar or a rotating member may also be utilized to disengage the locks. Alternatively, electrical conductors may be utilized as releasable locks such that electrical conductors along a lower edge of the upper housing 202 releasably engage with electrical conductors along an upper edge of the lower housing 210 when the electrical conductors are coupled.

Information may be displayed on the upper touch-sensitive display 116 and on the lower touch-sensitive display 118 and information may be displayed continuously from the upper touch-sensitive display 116 to the lower touch-sensitive display 118 such that information that starts on the upper touch-sensitive display 116 may be continued on the lower touch-sensitive display 118 to operate as a single display.

Figure 5:
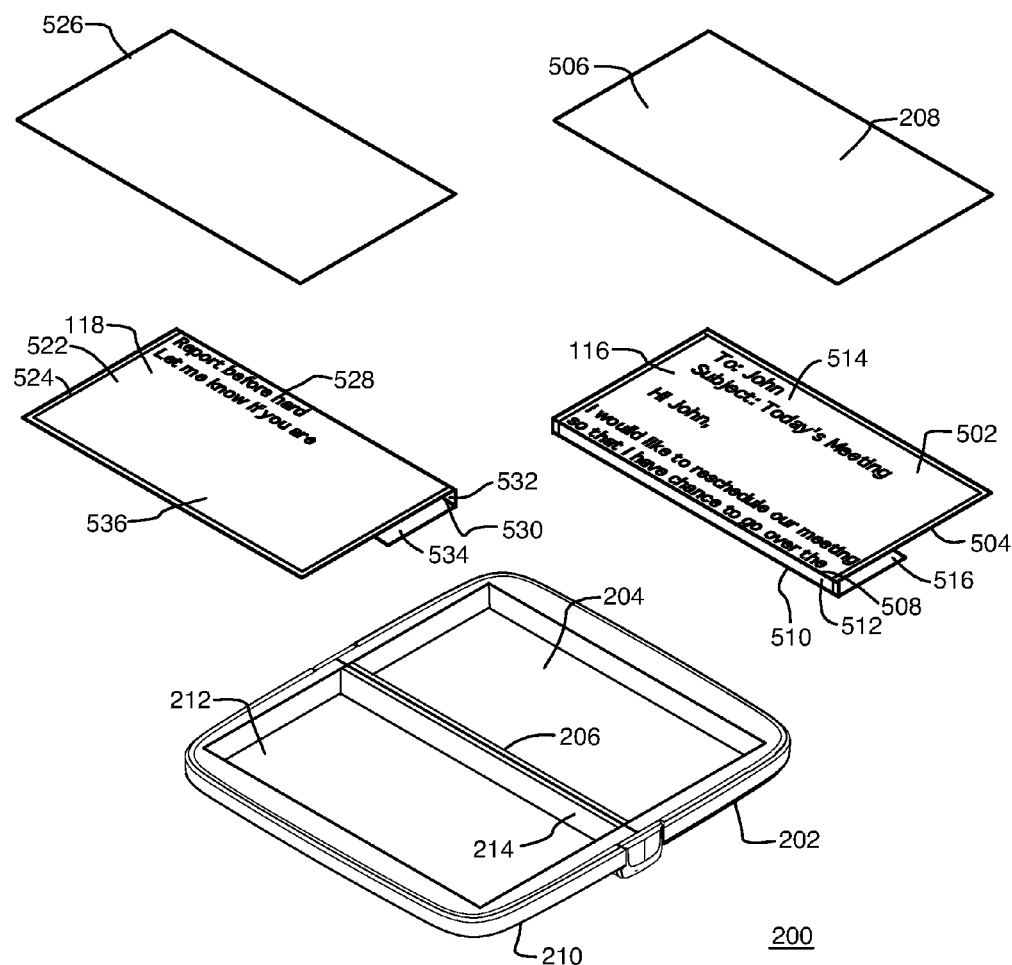
FIG. 5 is a partial exploded view of the portable electronic device in accordance with the disclosure.

A partial exploded view of the portable electronic device 100 is illustrated in FIG. 5. Displays, such as the upper touch-sensitive display 116, include a display area 502 in which information may be displayed and a non-display area 504 that surrounds the display area in this example. The non-display area 504 may include, for example, electronic traces or electrical connections, adhesives or other sealants, and/or protective coatings around the edges of the display area. The lower touch-sensitive display 118 also includes a display area 522 and a non-display area 524. Although the non-display area illustrated in the figures is relatively small, the non-display area may be larger than shown.

The upper touch-sensitive display 116 may be a flexible display that may be, for example electronic paper (e-paper), or an organic light emitting diode (OLED) display that includes a flexible substrate to facilitate flexing or bending of the display. Touch-sensing layers may be deposited on the display to provide the flexible touch-sensitive display. The lower touch-sensitive display 118 may similarly be a flexible display as described herein. Although both displays are described as being touch-sensitive, one or neither of the upper touch-sensitive display 116 and the lower touch-sensitive display 118 may be a display with touch-sensing capability.

A cover 506 that protects the upper touch-sensitive display 116 is illustrated in the partial exploded view of the portable electronic device 100 shown in FIG. 5. The cover 506 may be any suitable cover comprising, for example, a polymer or glass protective material.

The upper touch-sensitive display 116 has two folds 508, 510 that extend across the width of the upper touch-sensitive display 116 and are generally parallel. The upper touch-sensitive display 116 is folded along one fold 508 such that a second panel 512 extends about 90 degrees from the larger main panel 514 that includes the display area 502 of the display 116 and along a lower one of the sidewalls 206. A third panel 516 extends about 90 degrees from the second panel 512 and extends partially along the back 204 of the upper housing 202. The folds may have a relatively small radius of curvature. The panels 512, 514, 516 may alternatively be more or less than 90 degrees apart. The second and third panels 512, 516 include the non-display area 504 from the bottom end of the upper touch-sensitive display 116, such that the non-display area 504 from the bottom end is folded under and is non-coplanar with the display area 502 on which information is displayed, i.e., the folded non-display 504 area and the display area 502 are in different planes. Thus, the non-display area 504 at the bottom end of the upper touch-sensitive display 116 is folded out of view and under the cover 506, and information may be displayed on the main panel 514 of the display 116 up to the fold 508 where the main panel 514 meets the second panel 512.

The lower touch-sensitive display 118 also includes two folds 528, 530, similar to the upper touch-sensitive display 116. The second panel 532 of the lower touch-sensitive display 118, however, extends along an upper one of the sidewalls 214. The third panel 534 extends along the back of the lower housing 210. The non-display area 524 from the top end of the lower touch-sensitive display 118 is folded out of view, and information may be displayed on the main panel 536 of the touch-sensitive display 118 up to the fold 528 between the main panel 536 and the second panel 532. The main panel 536 is covered by the cover 526.

Optionally, the sidewalls of the upper housing 202 need not have the same height. For example, the lower one of the sidewalls 206 of the upper housing 202 may have a different height than the back of the upper housing. The upper one of the sidewalls 214 of the lower housing 214 may also have a different height than the back of the lower housing. Alternatively, the upper housing 202 may not include a lower sidewall. Similarly, the lower housing 214 may not include an upper sidewall. Utilizing a partial sidewall or no sidewall, the gap between the upper touch-sensitive display 116 and the lower touch-sensitive display 118 may be very small.

Figure 6:
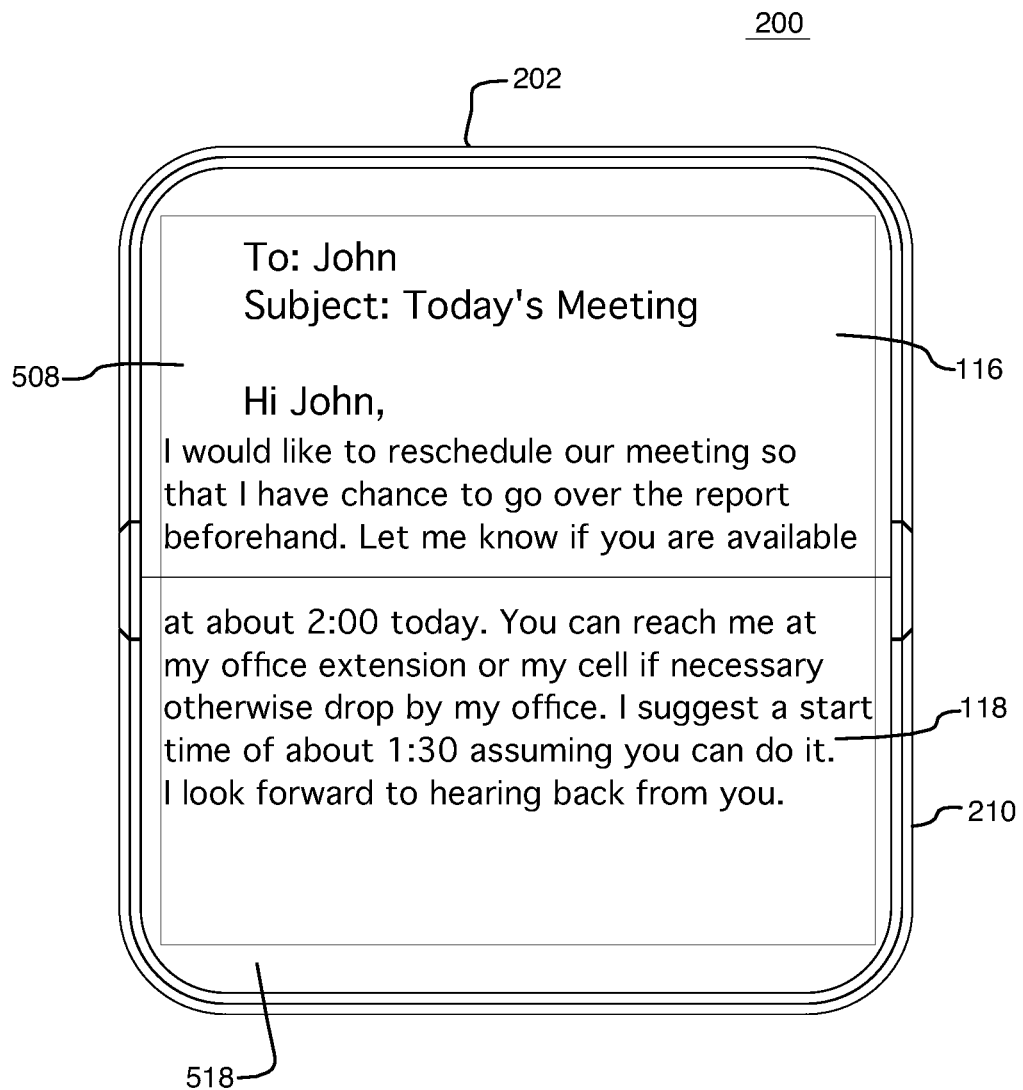
FIG. 6 is another front view of a portable electronic device in accordance with the disclosure.

Utilizing flexible displays, the upper touch-sensitive display 116 and the lower touch-sensitive display 118 may be folded to reduce how much of the non-display area is visible. As a result, the gap between the display area 502 of the upper touch-sensitive display 116 and the display area 522 of the lower touch-sensitive display 118 is reduced. Each device has an available area for the display and by folding the non-display area out of view, a larger area is available to display information. The folds 508, 510 of the upper touch-sensitive display 116 are near the folds 528, 530 of the lower touch-sensitive display 118. Information may be displayed continuously among separate displays with a very small gap in which information is not displayed, as shown in FIG. 6. The gap may, for example, the width housing(s) or the hinge of the portable electronic device 500.

In the example described above, the upper touch-sensitive display 116 and the lower touch-sensitive display 118 each include two folds. Any other suitable number of folds may be utilized. For example, one fold may be utilized in either or each of the upper touch-sensitive display 116 and the lower touch-sensitive display 118 to reduce the gap in which information is not displayed between the display area 502 of the upper touch-sensitive display 116 and the display area 522 of the lower touch-sensitive display 118.

Figure 7:
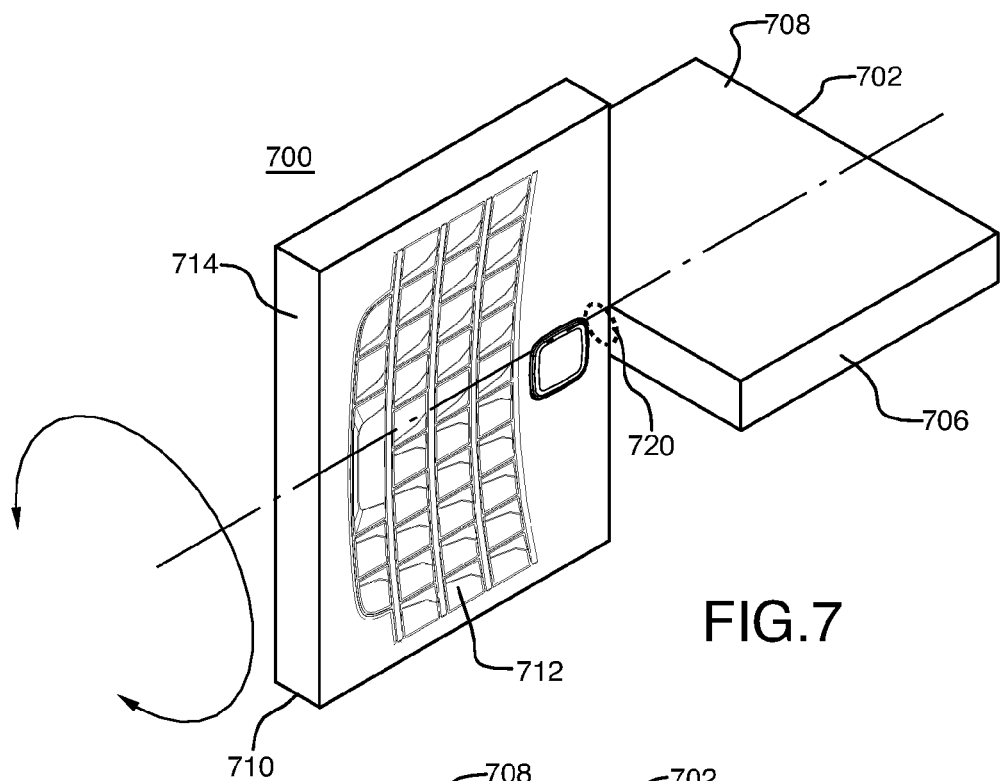
FIG. 7 is a perspective view of another example of a portable electronic device in accordance with the disclosure.
Figure 8:
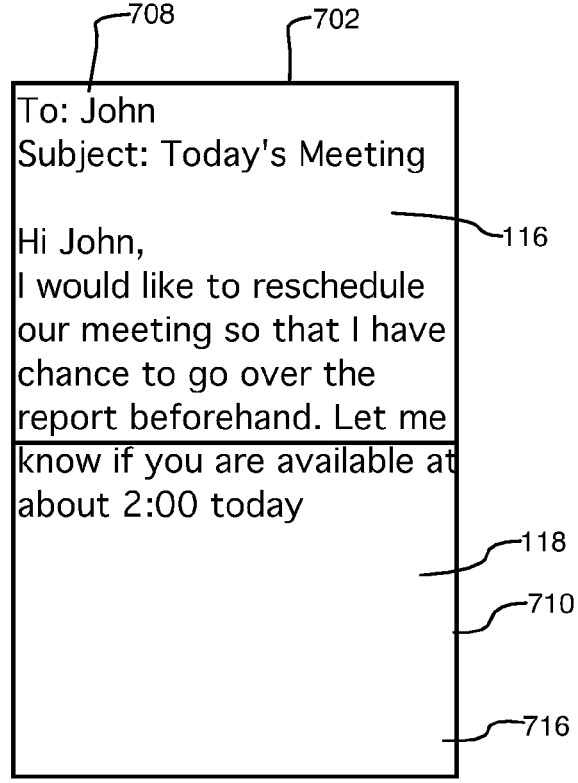
FIG. 8 a front view of a portable electronic device in accordance with the disclosure.

Another example of a portable electronic device 700 is shown in FIG. 7 and FIG. 8. The portable electronic device 700 includes an upper housing 702 in which the upper touch-sensitive display 116 is disposed. The upper housing 702 includes a back and sidewalls 706 that extend from the back to a cover 708. The portable electronic device 700 also includes a lower housing 710 that includes a keyboard 712 on one side of the housing and sidewalls 714 that extend from the back to a cover 716. The lower touch-sensitive display 118 is disposed in the lower housing 710 and covered by the cover 716.

The lower housing 710 is coupled to the upper housing 702 and is rotatable relative to the upper housing 702 about, for example, a shaft 720, between a keyboard orientation in which the keyboard 712 is adjacent to the upper touch-sensitive display 116 and an extended display orientation in which the lower touch-sensitive display 118 is adjacent to the upper touch-sensitive display 116. Alternatively, the lower housing 710 may be coupled to the upper housing 702 by a ball joint.

In the example of FIG. 7 and FIG. 8, the upper touch-sensitive display 116 may be folded along four sides of the display area such that the non-display area along all four sides of the display area is folded out of view and information may be displayed up to any fold in the upper touch-sensitive display 116. The display area of the upper touch-sensitive display 116 extends up to a lower one of the sidewalls 706 of the housing 702. The lower touch-sensitive display 118 may also be folded along four sides of the display area such that the non-display area is folded out of view and information may be displayed up to any fold in the lower touch-sensitive display 118. The display area of the lower touch-sensitive display 118 extends to an upper one of the sidewalls 714 of the housing 710. Cut-outs or extra folds in the non-display area may be made to facilitate the folds on consecutive sides.

When the portable electronic device is in the extended display orientation shown in FIG. 8, the lower touch-sensitive display 118 is adjacent to, generally coplanar with, and faces the same direction as the upper touch-sensitive display 116.

Because the folds in the display do not change during the life of the display, the folded display is not subjected to repeated folding and unfolding that may cause fatigue and cracking of the display.

A portable electronic device includes a first flexible display. The first flexible display includes a display area, a non-display area, and a first fold such that at least part of the non-display area is non-coplanar with the display area. Information is displayable near the first fold.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A portable electronic device comprising:
   a first flexible display comprising a first display area and a first non-display area and including a first fold, such that a first panel comprising at least part of the first non-display area is non-coplanar with the first display area;
   a first housing comprising a plurality of sidewalls and including a first edge that is absent a sidewall, wherein the flexible display is disposed in the first housing such that the first fold is disposed along the first edge of the first housing that is absent the sidewall, wherein the first panel is folded under the first display area, wherein information is displayable on the first flexible display up to the first edge;
   wherein the first fold is maintained while the information is displayed in the first display area;
   a second flexible display comprising a second display area and a second non-display area and including a second fold, such that a second panel comprising at least part of the second non-display area is non-coplanar with the second display area;
   a second housing coupled to the first housing, the second housing comprising a plurality of sidewalls and including a second edge that is absent a sidewall, wherein the flexible display is disposed in the second housing such that the second fold is disposed along the second edge of the second housing that is absent the sidewall, wherein the second panel is folded under the second display area, wherein information is displayable on the second flexible display up to the second edge;
   wherein the second fold is maintained while the information is displayed in the second display area; and
   wherein the second housing is adjacent the first housing and the first fold of the first flexible display is adjacent to the second fold of the second flexible display such that the first display area of the first flexible display is adjacent the second display area of the second flexible display without the first non-display area, the second non-display area and any intervening sidewall disposed between the first display area and the second display area.

2. The portable electronic device according to claim 1, wherein the first display area extends up to the first fold and the second display area extends up to the second fold.

3. The portable electronic device according to claim 1, wherein the first fold and the second fold are permanent folds.

4. The portable electronic device according to claim 1, wherein the first flexible display includes:
   additional folds, such that additional panels comprising at least part of additional non-display areas are non-coplanar with the second display area.

5. The portable electronic device according to claim 4, wherein the flexible display includes cut-outs in the additional non-display areas to facilitate the first fold, the second fold, the third fold, and the fourth fold.

6. The portable electronic device according to claim 1, wherein the first flexible display comprises a touch-sensitive display.

7. The portable electronic device according to claim 1, comprising at least one touch-sensing layer deposited on the first flexible display.

8. The portable electronic device according to claim 1, wherein the first flexible display comprises a first touch-sensitive display and the second flexible display comprises a second touch-sensitive display.

9. The portable electronic device according to claim 1, comprising at least one touch-sensing layer deposited on the first flexible display and comprising at least one touch-sensing layer deposited on the second flexible display.

* * * * *